United States Patent
Higashida

(10) Patent No.: US 6,523,136 B1
(45) Date of Patent: Feb. 18, 2003

(54) SEMICONDUCTOR INTEGRATED CIRCUIT DEVICE WITH PROCESSOR

(75) Inventor: Motoki Higashida, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,003

(22) Filed: Oct. 26, 1999

(30) Foreign Application Priority Data

May 20, 1999 (JP) .......................................... 11-140411

(51) Int. Cl.⁷ ................................................ G06F 11/00
(52) U.S. Cl. ........................................ 714/30; 714/45
(58) Field of Search ............................ 714/30, 32, 39, 714/41, 42, 43, 47, 25, 26, 27, 31, 34, 35, 45, 46, 733, 734; 710/109, 260

(56) References Cited

U.S. PATENT DOCUMENTS

| | | | | |
|---|---|---|---|---|
| 5,361,348 A | * | 11/1994 | Nakamoto | 395/575 |
| 5,640,542 A | * | 6/1997 | Whitsel et al. | 395/500 |
| 5,704,034 A | * | 12/1997 | Circello | 395/183.14 |
| 5,848,264 A | * | 12/1998 | Baird et al. | 395/500 |
| 5,862,148 A | * | 1/1999 | Typaldos et al. | 371/22.1 |
| 5,862,371 A | | 1/1999 | Levine et al. | 395/569 |
| 5,903,912 A | * | 5/1999 | Hansen | 711/154 |
| 5,943,498 A | * | 8/1999 | Yano et al. | 395/704 |
| 5,964,893 A | * | 10/1999 | Circello et al. | 714/39 |
| 5,978,937 A | * | 11/1999 | Miyamori et al. | 714/45 |
| 6,026,501 A | * | 2/2000 | Hohl et al. | 714/38 |
| 6,035,422 A | * | 3/2000 | Hohl et al. | 714/35 |
| 6,055,656 A | * | 4/2000 | Wilson, Jr. et al. | 714/724 |
| 6,311,292 B1 | * | 10/2001 | Choquette et al. | 714/30 |

FOREIGN PATENT DOCUMENTS

JP 4-171542 6/1992

OTHER PUBLICATIONS

English Search Report dated Sep. 27, 2000.

* cited by examiner

*Primary Examiner*—Nadeem Iqbal
(74) *Attorney, Agent, or Firm*—McDermott, Will & Emery

(57) ABSTRACT

A multiplexer is provided for selecting Central Processing Unit (CPU) operation trace information sent from a debug support unit and an internal signal on an internal bus in accordance with a test mode signal, and for transmitting the selected information or signal to a pin terminal for CPU operation trace information signal. A semiconductor integrated circuit device with a processor is provided which allows easy external monitoring of the internal signals, and therefore allows easy debugging even at an on-board level without increase in number of the pin terminals.

7 Claims, 9 Drawing Sheets

```
Function()
{
01:  DMA_start();
02:  first_func();         ← START OF TRACE
03:  *Address8 = Data5;
04:  second_func(Data5);
05:  third_func();
06:  Data5 = *Address8;
07:  fourth_func(Data5);
}
```

| PC | PC | PC | PC | AD | AD | AD | CTL | CTL | DT | DT | DT | DT |

SEMICONDUCTOR INTEGRATED CIRCUIT DEVICE WITH PROCESSOR

BACKGROUND OF THE INVENTION

1. Field of the Invention

The present invention relates to a semiconductor integrated circuit device with a processor, and in particular a semiconductor integrated circuit device with a processor allowing easy debugging.

2. Description of the Background Art

Processors such as an MPU (Microprocessor Unit) and a CPU (Central Processor Unit) are subjected to debugging such as verification of programs and verification of hardware operations. For facilitating such debugging, a debug support unit for supporting the debug operation is conventionally arranged within a processor. Particularly in a so-called "system-on-chip" structure with a processor and a peripheral LSI (Large Scale Integrated Circuit Device) integrated on a single chip, complicated internal structures must be operated accurately, and the debugging is required.

FIG. 15 schematically shows internal structures of a semiconductor integrated circuit device with a processor and a debug environment in the prior art. In FIG. 15, semiconductor integrated circuit device 1 with a processor (which will be referred to as "LSI with CPU 1" hereinafter) includes a CPU core 2 for performing a processing instructed by an instruction applied thereto, a Read-Only Memory (ROM) 4 for storing a program, a Random Access Memory (RAM) 5 for retaining intermediate data, an IO module 6 including an I/O circuit for externally transmitting and receiving signals including data, and a Direct Memory Access Controller (DMAC) 7 for directly accessing RAM 5 to externally transmit and receive data. These CPU core 2, ROM 4, RAM 5, I/O module 6 and DMAC 7 are interconnected via an internal bus 3.

CPU core 2 is equipped with a Debug Support Unit (DSU) 2a for facilitating debugging of software (program) to be executed by CPU core 2. Debug support unit (DSU) 2a is connected to a DSU control signal line connected to a pin terminal 10, a CPU event notifying signal line connected to a pin terminal 11 for externally notifying that the CPU attains a specific internal state, and to a signal line connected to a pin terminal 12 for tracing an operation state of the CPU.

LSI with CPU 1 further includes a debugging multiplexer (MUX) 18 for connecting one of IO module 6 and internal bus 3 to an I/O terminal 13 in accordance with a test mode instructing signal TP applied via a pin terminal 19. Internal bus 3 transmits signals including data, address signals and control signals.

In LSI with CPU 1, CPU core 2 and DMAC 7 form a bus master of internal bus 3. This internal bus 3 is further connected to peripheral circuits such as a bus arbiter, which are not shown in the figure for simplicity reason.

In the debug operation, LSI with CPU 1 is coupled via pin terminals 10–12 to a DSU-adapted debug device 20 which in turn is externally arranged. DSU-adapted debug device 20 includes a controller 20a for controlling an operation of debug support unit (DSU) 2a included in CPU core 2, and a trace data storage memory 20b controlled by controller 20a to store a CPU operation state trace signal applied from debug support unit 2a via pin terminal 12. DSU-adapted debug device 20 is coupled to a computer 30 via a pin terminal 22. Accordingly, DSU-adapted debug device 20 can control the operation of the CPU included in CPU core 2 under control of computer 30, and can display the trace data stored in trace data storage memory 20b on the display screen of computer 30.

Under the debug environment, I/O terminal 13 is coupled to a logic analyzer 40 via a probe cable 42. Logic analyzer 40 monitors the logical levels of the signals on I/O terminal 13.

In the normal operation, debugging multiplexer (MUX) 18 selects and couples IO module 6 to I/O terminal 13. In the debug environment, debugging multiplexer (MUX) 18 couples internal bus 3 to I/O terminal 13 in response to activation of test mode instructing signal TP applied to pin terminal 19. By coupling internal bus 3 to I/O terminal 13 via debugging multiplexer (MUX) 8, the state of internal bus 3 is monitored by logic analyzer 40 in the debug environment. During debugging of software running on LSI with CPU 1, it is necessary to externally monitor signals that are output onto internal bus 3 in accordance with the software executed by CPU core 2, to determine whether this software is executed accurately or not. Debugging multiplexer (MUX) 18 is provided for the purpose of externally monitoring the signal value on internal bus 3.

In the debug operation, DSU-adapted debug device 20 applies control signals to debug support unit 2a via DSU control pin terminal 10, and the CPU core 2 executes the instruction under the control of these control signals. Debug support unit 2a monitors the operation state of the CPU included in CPU core 2, and applies a CPU event notifying signal to DSU-adapted debug device 20 via pin terminal 11 when the CPU attains a specific internal state specified at the time of debugging. In DSU-adapted debug device 20, when the CPU event notifying signal received via pin terminal 11 from debug support unit 2a becomes active, controller 20a applies a write instruction to trace data storage memory 20b, and the CPU operation trace information applied via pin terminal 12 from debug support unit 2a is stored therein. The CPU operation trace information stored in trace data storage memory 20b is applied to computer 30 via pin terminal 22 for display on the computer screen or the like.

Under the debug environment, debugging multiplexer (MUX) 18 couples I/O bus 3 to I/O pin 13, and logic analyzer 40 monitors the signal values on internal bus 3 via I/O pin 13 and debugging multiplexer (MUX) 18. The result of monitoring is displayed on a display screen of logic analyzer 40.

An operator checks information displayed on the display screen of computer 30 and the display screen of logic analyzer 40, and determines whether the CPU core 2 operates correctly to execute the specified instructions or not.

When an abnormality is found, the instruction causing the abnormality is identified based on the CPU operation trace information, and the debug is executed.

In this LSI with CPU 1, the bus master of internal bus 3 is CPU core 2 and direct memory access controller (DMAC) 7. When the CPU of CPU core 2 is performing arithmetic processing, direct memory access controller (DMAC) 7 accesses random access memory (RAM) 5 without adversely affecting the arithmetic operation, and executes data transfer with an external common memory or a logic/processor. In this LSI with CPU 1, the CPU included in CPU core 2 and direct memory access controller (DMAC) 7 operate in parallel with each other. Debugging relating to the parallel operation of CPU core 2 and direct memory access controller (DMAC) 7 is very important for ensuring integrity of data.

In this debug environment for the conventional LSI with CPU shown in FIG. 15, the signal values on internal bus 3 are displayed on the screen of logic analyzer 40, and the information relating to the operation state of the CPU included in CPU core 2 is displayed on the screen of computer 30. Logic analyzer 40 and computer 30 operate independently of each other. Therefore, the operation state information of the CPU included in CPU core 2 cannot be displayed on the same time base as the signal values on the internal bus. Therefore, it is difficult to correlatingly analyze the operation of CPU included in CPU core 2 and the operation state of the direct memory access controller (DMAC). Accordingly, it is extremely difficult to perform the debugging relating to the parallel operation of the CPU and the direct memory access controller (DMAC).

Since logic analyzer 40 is used, it is necessary to connect probe cable 42 to I/O pin terminals 13, and therefore I/O pin terminals 13 must be arranged on a circuit board. Therefore, logic analyzer 40 cannot be used for a Ball Grid Array (BGA) or the like in which the pin terminals are arranged under the circuit board. This results in a problem that the debugging restricts the arrangement of the I/O pin terminals in the LSI with CPU.

In the structure where a memory of a large storage capacity is integrated with CPU core 2 on the same circuit substrate, the bit width of internal bus 3 is not restricted by the number of pin terminals so that the pin width can be made sufficiently large. Meanwhile, the number of I/O pin terminals 13 and other pin terminals is restricted by the number of external pin terminals of a package of this LSI with CPU, and can be increased only to a limited value. Therefore, it is impossible to apply all the signal values on the signal lines included in internal bus 3 to logic analyzer 40, and the state of the internal bus cannot be externally monitored with sufficient accuracy.

In the actual operation, IO module 6 is used as an originally intended I/O circuit for data input/output. In the structure where LSI with CPU 1 is mounted on the board, therefore, I/O pin terminals 13 are connected to pin terminals of another device via interconnection lines, and IO module 6 is connected to IO pin terminals 13 via debugging multiplexer (MUX) 18. At the on-board level, therefore, it is impossible for logic analyzer 40 to monitor the signal values on I/O pin terminals 13 with probe cable 42 connected to I/O pin terminals 13. Thus, debugging can be performed only in the LSI with CPU alone.

Further, debugging multiplexer (MUX) 18 is provided with driver for driving I/O pin terminals 13. In the system having LSI with CPU 1, the operation frequency is in a high speed range, e.g., from 100 MHz to 300 MHz. When I/O pin terminals 13 are charged and discharged in accordance with such a fast clock, noises are caused due to electromagnetic radiation. For reducing such radiation noises, an output driver for driving I/O pin terminals 13 generally has a relatively small driving capability so that rapid charging and discharging of I/O pin terminals 13 can be suppressed. In this case, however, the charging and discharging of I/O. pin terminals 13 is performed at a relatively low speed so that a large delay occurs in signal propagation through probe cable 42. Due to this, logic analyzer 40 cannot take in fast changes in signals transmitted on internal bus 3 in accordance with the fast clock signal, via I/O pin terminals 13 and probe cable 42. Accordingly, the state of internal bus 3 cannot be externally monitored with sufficient accuracy.

SUMMARY OF THE INVENTION

An object of the invention is to provide a semiconductor integrated circuit device with a processor, which allows easy and accurate external monitoring of information required for debugging without any restriction by arrangement of pins.

Another object of the invention is to provide a semiconductor integrated circuit device with a processor, which allows external monitoring of internal bus signals without increasing the number of pins even if the internal bus has a large bit width.

According to the invention, in summary, a CPU operation trace information output pin is selectively supplied with CPU operation trace information and internal bus information.

Since the internal bus information and the processor operation information are transmitted via the same pin terminal, it is not necessary to output the internal bus information via an I/O pin terminal employed in the prior art, and the internal information can be externally monitored without increasing the number of the pin terminals and being restricted by the arrangement of pin terminals. Since the processor operation information and the internal bus information are externally transmitted via the same pin terminal, the processor operation information and the internal bus information can be analyzed by a single debug device with the time bases coincident, and the complicated debugging can be performed easily.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
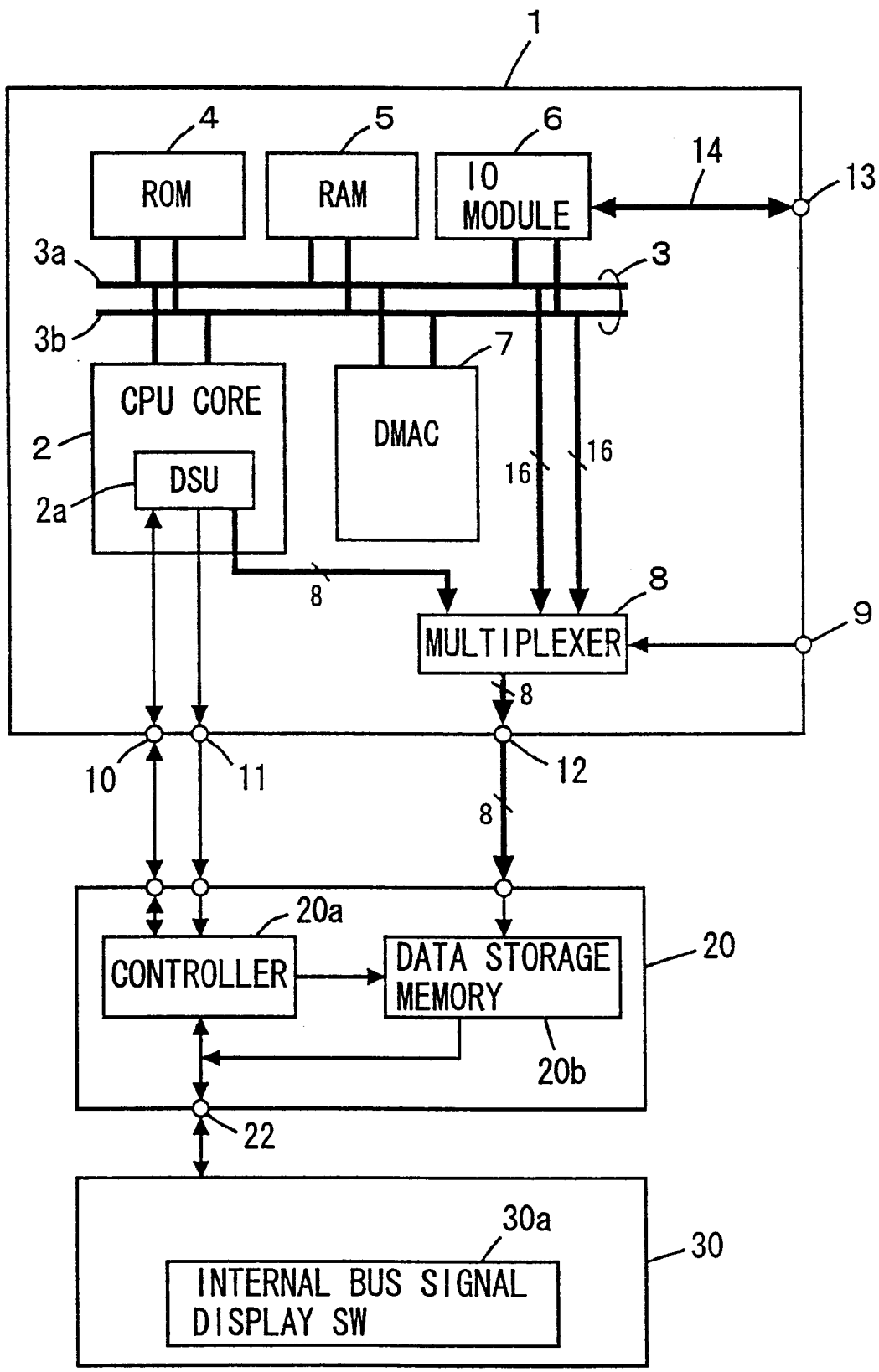
FIG. 1 schematically shows a semiconductor integrated circuit device with a processor and its debug environment according to a first embodiment of the invention.

FIG. 1 schematically shows a structure of a LSI with CPU and a debug environment thereof according to a first embodiment of the invention. Similarly to the prior art, LSI with CPU 1 shown in FIG. 1 includes a CPU core 2 coupled to an internal bus 3, a read-only memory (ROM) 4 for storing a program, a random access memory (RAM) 5 for storing intermediate data, an IO module 6 for input/output of signals including data, and a Direct Memory Access Controller (DMAC) 7. These components 2–7 are interconnected via internal bus 3. IO module 6 is coupled to an I/O pin terminal(s) 13 via an internal I/O bus 14. Internal I/O bus 14 has the same bit width as the terminals included I/O pin terminals 13.

CPU core 2 also includes a Debug Support Unit (DSU) 2a. Internal bus 3 includes an internal data bus 3a for transmitting internal data as well as an internal signal bus 3b for transmitting an address signal and a control signal.

LSI with CPU 1 includes a multiplexer 8, which in turn receives the signal of 16 bits on each of internal data bus 3a and internal signal bus 3b as well as CPU operation trace information from debug support unit 2a, selects one of the CPU operation trace information, internal data and internal signal in accordance with a test mode instructing signal applied from the pin terminal 9, and transmits the selected information or signal to the pin terminal 12 for the CPU operation trace information. According to the structure shown in FIG. 1, multiplexer 8 receives the internal data of 16 bits and the internal signals of 16 bits, and further receives the CPU operation trace information of 8 bits. In accordance with the test mode instructing signal applied from pin terminal 9, multiplexer 8 selects and transmits the signals of 8 bits to CPU operation trace pin terminals 12 of 8 bits.

As a debug environment, a DSU-adapted debug device 20 is arranged outside LSI with CPU 1. DSU-adapted debug device 20 includes a controller 20a which is coupled to debug support unit (DSU) 2a via DSU-control pin terminal 10 and CPU event notifying pin terminal 11, and a data storage memory 20b which receives and stores the signals including data sent from multiplexer 8 via CPU-operation trace pin terminal 12.

Controller 20a transmits and receives control signals required for debugging to and from debug support unit (DSU) 2a via DSU control pin terminal 10, and also receives the CPU event notifying signal from debug support unit (DSU) 2a via CPU event notifying pin terminal 11. Data storage memory 20b transmits its storage data to a computer 30 via pin terminal 22 under the control of controller 20a.

Computer 30 controls controller 20a via pin terminal 22, and also controls debug support unit (DSU) 2a via controller 20a of DSU-adapted debug device 20 similarly to the conventional system. Thereby, computer 30 can control execution of the instruction of CPU core 2. Similarly to the conventional system, computer 30 can display the CPU operation trace information stored in data storage memory 20b on its display screen.

Data storage memory 20b stores signals on internal bus 3 via multiplexer 8. In computer 30, therefore, internal bus signal display software (SW) is already installed for displaying the signals on internal bus 3 on the computer screen. Accordingly, the debug environment of LSI with CPU 1 shown in FIG. 1 does not use a logic analyzer in contrast to the conventional system. DSU-adapted debug device 20 is coupled to LSI with CPU 1 via pin terminals 10, 11 and 12.

Debug operation of LSI with CPU 1 shown in FIG. 1 will now be described. First, debug support unit (DSU) 2a receives information specifying a position (program address of a certain instruction), at which trace is to be started, from DSU-adapted debug device 20. According to this trace start position information, debug support unit (DSU) 2a stores the specified trace start information in a status register. Then, in accordance with the debug start instruction applied from an operator, DSU-adapted debug device 20 applies a control signal for starting the operation to debug support unit 2a via DSU control pin terminal 10. In accordance with this operation start instructing signal, debug support unit (DSU) 2a is activated, and the CPU of CPU core 2 successively executes the instructions in accordance with a program counter (not shown). When the CPU executing instruction address matches with the trace start position information stored in the status register of debug support unit (DSU) 2a, debug support unit (DSU) 2a applies the CPU event notifying signal to DSU-adapted debug device 20 via CPU event notifying terminal 11. In this operation, multiplexer 8 is already set to a state of selecting either the signals on internal bus 3 or the CPU operation trace information sent from debug support unit (DSU) 2a in accordance with the test mode instructing signal sent from pin terminal 9.

When DSU-adapted debug device 20 is supplied with the CPU event notifying signal from debug support unit (DSU) 2a and is activated, it stores in data storage memory 20b the signals (data) applied from multiplexer 8 via pin terminals 12 under the control of controller 20a. In accordance with the connection state of multiplexer 8, data storage memory 20b stores either of the CPU operation trace information, the internal data on; internal data bus 3a, and the signals (i.e., address signals or control signals) on internal signal bus 3b.

When this trace operation is completed, computer 30 sends an access request for DSU-adapted debug device 20 to controller 20a via pin terminal 22; so that the information stored in data storage memory 20b is read out. Software (SW) 30a for internal bus signal display is newly installed in computer 30. Therefore, by activating the software (not shown) for CPU operation trace information display as well as software 30a for internal bus signal display, the data read out from data storage memory 20b can be displayed on the computer screen, and the signal values on internal bus 3 are displayed on the time base coincident with that of the CPU operation trace information. Thereby, it is possible to perform the debugging while displaying in parallel the operation state of CPU core 2 and the signal values on internal bus 3 during the parallel operation of CPU core 2 and direct memory access controller (DMAC).

It is not necessary to connect a logic analyzer to I/O terminals 13, and therefore it is not necessary to arrange I/O terminals 13 in positions allowing external connection. This increases flexibility in pin arrangement, and a pin arrangement such as a ball grid array (BGA) can be used. Even at the on-board assembly level that IO module 6 is connected to I/O terminals 13, the signal values on internal bus 3 can be externally monitored via pin terminals 10, 11 and 12 dedicated to debug so that debugging at the on-board assembly level can be performed.

The signal values on internal bus 3 are applied to externally arranged DSU-adapted debug device 20 via CPU operation trace pin terminal(s) 12. Therefore, the signal values on internal bus 3 can be externally output without an influence by the number of external pin terminals.

A driver for transmitting the CPU operation trace information from multiplexer 8 to pin terminal 12 has a drive capability enough to allow external transmission of the operation state of CPU operating in synchronization with the internal clock signal (not shown). Accordingly, the signal values on internal bus 3, which change in synchronization with the above internal clock, can likewise be transmitted externally via the drivers which transmit the CPU operation trace information to pin terminals 12. The states of signals on internal bus 3, which change rapidly, can be accurately transmitted to externally provided DSU-adapted debug device 20, and thereby the accurate debug operation can be ensured.

Structures of Respective Portions

Figure 2:
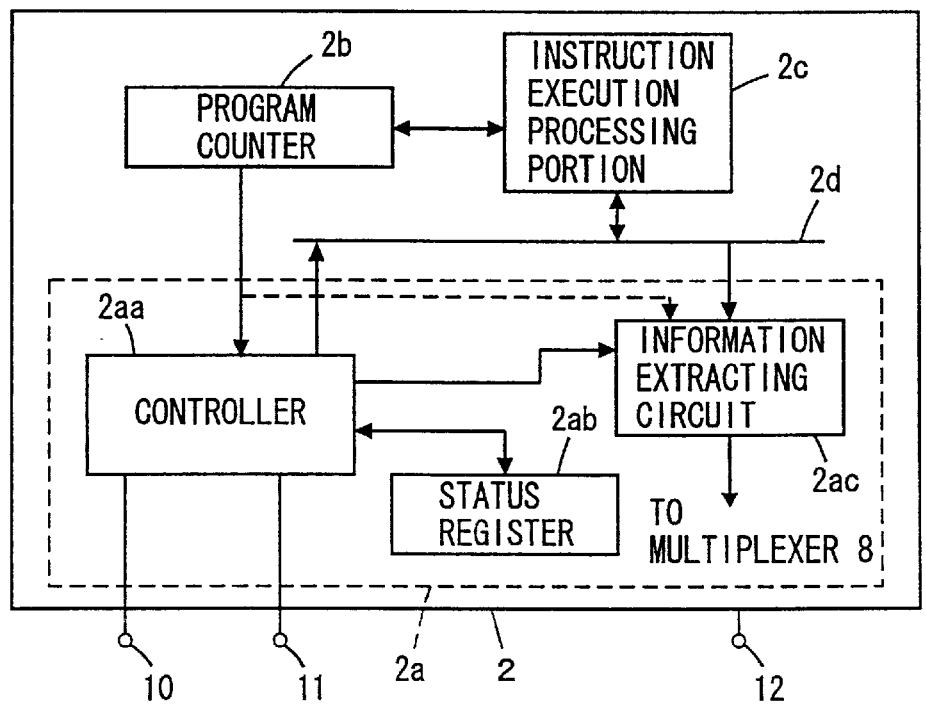
FIG. 2 schematically shows a structure of a CPU core shown in FIG. 1.

FIG. 2 schematically shows a structure of CPU core 2 shown in FIG. 1. In FIG. 2, CPU core 2 include a program counter 2b which produces an instruction address designating the address of an instruction to be executed, and an instruction execution processing portion 2c which accesses an instruction memory (not shown) in accordance with the instruction address sent from program counter 2b, and executes the specified instruction. Instruction execution processing portion 2c transmits a control signal, address signal and data via a CPU internal bus 2d coupled to internal bus 3 via an I/O port (not shown). CPU core 2 includes a register circuit for storing necessary data, flag and others, and also includes a cache memory for caching necessary data, although these are not shown in the figure for simplicity reason.

Debug support unit 2a includes a controller 2aa coupled to pin terminals 10 and 11 for performing input/output of the DSU control signal and the CPU event notifying signal, a status register 2ab for storing the information relating to the CPU operation trace start position under the control of controller 2aa, and an information extracting circuit 2ac coupled to CPU internal bus 2d and controlled by controller 2aa to extract the signals representing the operation state of this CPU and apply the extracted signals to multiplexer 8.

The status register 2ab stores the count value of program counter 2b representing the trace start position, and the controller 2aa drives the CPU event notifying signal to the active state when the count value of program counter 2b matches with the trace start position information (address) stored in status register 2ab. Controller 2aa also applies the control signal for starting the execution of instruction to instruction execution processing portion 2c via CPU internal bus 2d during debugging.

Information extracting circuit 2ac, which is coupled to CPU internal data bus 2d, is merely required to be coupled to receive the signal representing the operation state of the CPU, and may be configured to extract the count value of program counter 2b, as depicted by dotted line, or information of another circuit such as a register circuit.

Figure 3:
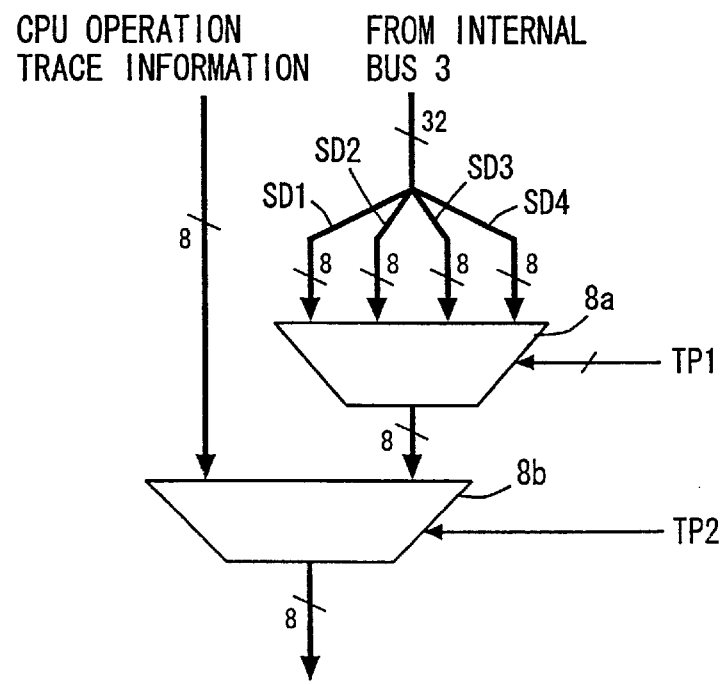
FIG. 3 schematically shows a structure of a multiplexer shown in FIG. 1.

FIG. 3 schematically shows a structure of multiplexer 8 shown in FIG. 1. As shown in FIG. 3, internal bus 3 includes internal data bus 3a and internal signal bus 3b each having a width of 16 bits, and has a total width of 32 bits. Internal bus 3 is divided into four sub-buses SD1–SD4 each having a width of 8 bits. Multiplexer 8 includes a first multiplexer 8a which selects one of sub-buses SD1–SD4 in accordance with a test mode instructing signal TP1, and a second multiplexer 8b which selects either the CPU operation trace information generated from debug support unit (DSU) 2 or the output signal of first multiplexer 8a in accordance with a second test mode instructing signal TP2, and transmits the selected information or signal to pin terminals 12.

The CPU operation trace information is formed of 8 bits, and CPU operation trace pin terminals 12 likewise have a width of 8 bits. Internal bus 3 has a width of 32 bits, and is larger in bit width than the CPU operation trace pin terminals 12. However, owing to division of internal bus 3 into several sub-buses SD1–SD4, necessary internal signal values can be selected and can be externally monitored. By appropriately driving test mode instructing signal TP1 to the selected state, all the states of internal signals on internal bus 3 of 32 bit width can be externally monitored.

First test mode instructing signal TP1 selects one from four sub-buses SD1–SD4. In a simple form, first test mode instructing signal TP1 has a width of 4 bits. However, such a structure may be employed that a 2-bit decoder is provided for this first multiplexer, and this 2-bit decoder decodes the test mode instructing signal of 2 bit width to select one from four sub-buses SD1–SD4.

For sub-buses SD1–SD4, internal data bus 3a is divided into two sub-buses, and internal signal bus 3b is divided into two sub-buses.

In the above description, internal bus 3 has a width of 32 bits. However, internal bus 3 may have a larger bus width, e.g., of 64 bits or 128 bits. Each of the divided sub-buses may have the same bit width as the CPU operation trace information, and may be selected by the first multiplexer, whereby the states of intended internal signals on the internal bus having a large bit width can be externally monitored.

Figure 4:
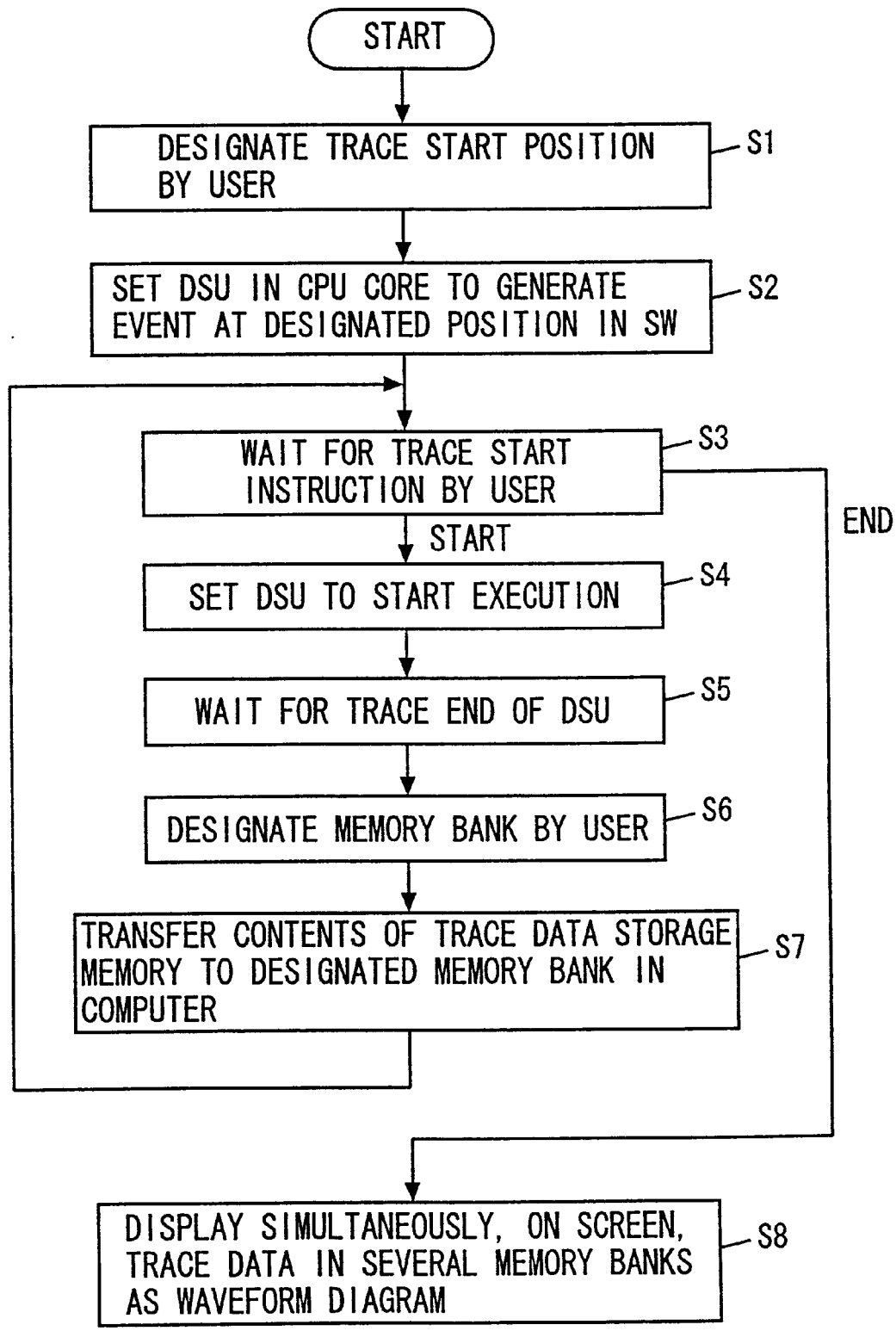
FIG. 4 is a flow chart showing a process sequence of software for internal bus signal display shown in FIG. 1.

FIG. 4 shows a process flow of software (SW) for the internal bus signal display shown in FIG. 1. The process flow of internal bus signal display software 30a will now be described.

Before executing this internal bus signal display processing, a user (operator) first designates an address at which tracing of the internal state of CPU of CPU core 2 is to be started (step S1). For this, the operator designates the address of an instruction to be executed by the instruction execution processing portion 2c included in CPU core 2, or an order of execution of the instructions (instruction number; program line number).

Computer 30 applies information, which indicates the start address or position designated by the user (operator), to the debug support unit (DSU) included in CPU core 2, and makes setting such that the CPU event notifying signal is driven to the active state at the designated position of software (program) (step S2). In debug support unit (DSU) 2a, information indicating the trace start position is stored in status register 2ab.

By the processing in steps S1 and S2, the initial setting for displaying the signals on the internal bus is completed. In this operation, multiplexer 8 is set to the state for selecting one of sub-buses SD1–SD4 of internal bus 3 in accordance with test mode instructing signals TP1 and TP2 applied from an outside of a board upon on-board assembly. In this state, the process waits for application of the trace start instruction by the user (step S3).

When the user instructs the start of tracing, computer 30 instructs debug support unit 2a via DSU-adapted debug device 20 to start the instruction execution(step S4). At this time, DSU-adapted debug device 20 is supplied with an instruction to start the tracing when the event notifying signal sent from debug support unit (DSU) 2a becomes active, and continues the tracing until the storage capacity of data storage memory 20b becomes full. When debug support unit 2a is instructed by DSU-adapted debug device 20 to start instruction execution, debug support unit 2a acts on instruction execution processing portion 2c (see FIG. 2) to start the instruction execution. At this time of start, the trace information is transferred between debug support unit (DSU) 2a and DSU-adapted debug device 20, and computer 30 monitors DSU-adapted debug device 20 until the end of tracing (step S5).

When the trace operation ends, DSU-adapted debug device 20 sends a trace ending instruction to computer 30 via pin terminal 22. Then, computer 30 displays the ending of trace operation on the screen, and enters the state of waiting for the designation of a memory bank by the user (operator) (step S6). When this display indicating the ending of tracing is performed, the user (operator) designates a memory bank (or file) in the computer for storing the trace information. When the memory bank (or file) is designated, computer 30 acts on DSU-adapted debug device 20 to read out the data stored in data storage memory 20b under the control of controller 20a. The trace information read out (transferred) from data storage memory 20b is transferred to and stored in the designated memory bank (step S7).

The information tracable at a time is restricted by the number of pins of CPU operation trace pin terminals 12. According to this first embodiment, the trace information of 8 bits can be stored via multiplexer 8 in trace data storage memory 20b of DSU-adapted debug device 20 in one cycle. If more information is required, the state of test mode instructing signal TP1 is switched to change the sub-bus to be selected and therefore the signals to be traced, and the process starting from step S3 is executed again to perform the tracing. When all the required trace information is obtained, the tracing is ended.

After the end of the required trace execution, the trace information is stored in the memory bank of the computer. In the case where a plurality of traces are performed, the resultant information of each trace is the signals obtained by starting the trace at the same position. If the sequences of input signals are the same in respective trace executions, LSI with CPU 1 repeats the same operation whenever the program is executed. Accordingly, the respective tracing result signals represent the states of different signals on internal bus 3 at the same time, starting at the same trace start position. Internal bus signal display software 30a simultaneously displays the tracing result information stored in respective memory banks on the screen as a waveform diagram having the start position defined by the trace position (step S8).

The user (operator) analyzes the waveform diagram displayed on the computer screen, determines whether the normal operation is performed or not, and executes the debug.

Figures 5, 6:
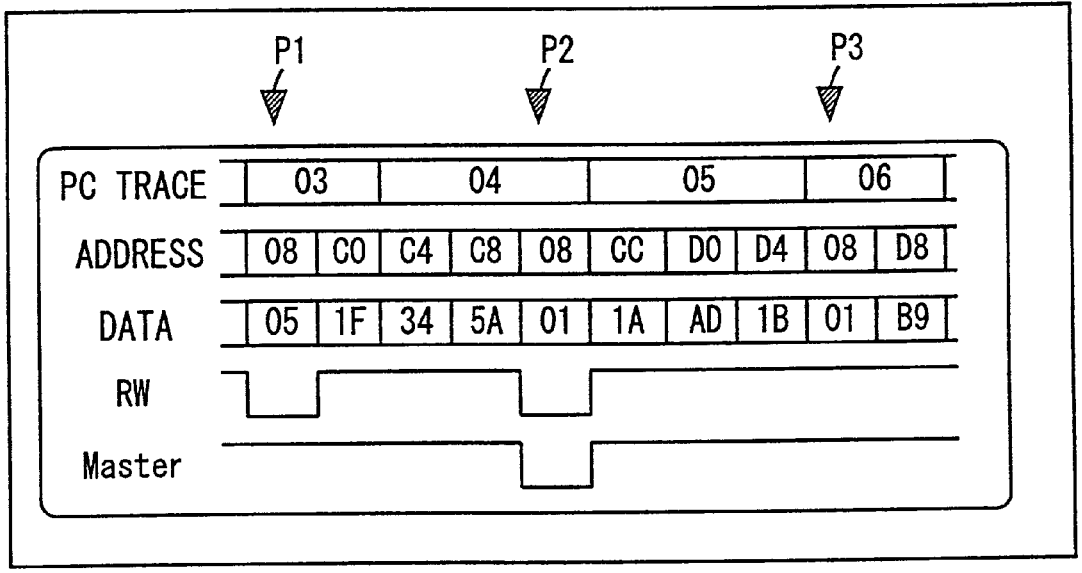
FIG. 5 shows by way of example a program to be debugged.
FIG. 6 shows a trace result obtained upon execution of the program shown in FIG. 5.

FIG. 5 shows an example of debug target software, i.e., software to be debugged. In FIG. 5, the debug target program is written in C language. A line number 01 represents an instruction, which starts the direct memory access operation and activates the direct memory access controller (DMAC). A line number 02 indicates an instruction for executing a certain first function by the CPU. A line number 03 represents an instruction for saving data Data5 at an address 8.

A line number 04 represents an instruction for performing a second function processing on data Data5. A line number 05 indicates an instruction of instructing the CPU to execute still another, i.e., third function.

A line number 06 represents an instruction for utilizing data stored as data Data5 at address 8. Thus, data Data5 saved by the instruction in line number 3 is fetched again in accordance with the instruction in line number 06.

In accordance with an instruction at a line number 07, fourth function processing is effected on fetched data Data5. In the series of processings described above, the instruction at line number 03 for saving data Data5 at address 8 is designated as the trace start position.

FIG. 6 shows a resultant display of tracing performed on the debug target program shown in FIG. 5. In FIG. 6, the trace information of the program counter (PC) is utilized as the signal indicating the state of CPU, i.e., the CPU operation trace information. As the signal values on the internal bus, the address, data and control signals are traced. Thus, tracing of the internal control signals is more specifically effected on a read/write instructing signal RW instructing read/write of data, as well as a master signal Master indicating whether it is the CPU or the direct memory access controller (DMAC) that uses the internal bus. The address is displayed in 8 bits, and FIG. 6 shows the address displayed in hexadecimal notation. The data to be traced is formed of 8 bits, and FIG. 6 shows the data in hexadecimal. Traces of the program counter, address, internal data and internal control signals are all performed using the instruction at line number 03 as the trace start position. These traces are performed by switching to the respective test mode instructing signals, and by execution of the same program shown in FIG. 5. This is because the same internal operation states are attained when the same program is executed.

The tracing result shown in FIG. 6 is displayed on the screen of computer 30. Read/write instructing signal RW instructs the data read operation when it is at a high level, and instructs the data write operation when it is at a low level. Mater signal Master indicates the internal bus access operation of CPU when it is at a high level, and indicates that the internal bus access operation of the direct memory access controller is performed when it is at a low level.

It can be understood from FIG. 6 that, at a point P1, the CPU writes the data "05H" into address 8 of the memory and that, at point P2, the direct memory access controller writes data "01" into the same address 8 of the same memory. Accordingly, it is understood that data "01H" overwritten by the direct memory access is read into the CPU when the data is read from the address 8 of the memory at a point P3. Thereby, conflict between data during the parallel operation of the CPU and the direct memory access controller is detected, and debugging such as rewriting of the program is performed. Accordingly, by displaying the CPU operation trace information and the signal values on the internal bus which are taken in via the same port, debug can be performed while maintaining the synchronization between the operation of the CPU in accordance with the software and the operation of the internal bus.

Second Embodiment

Figure 7:
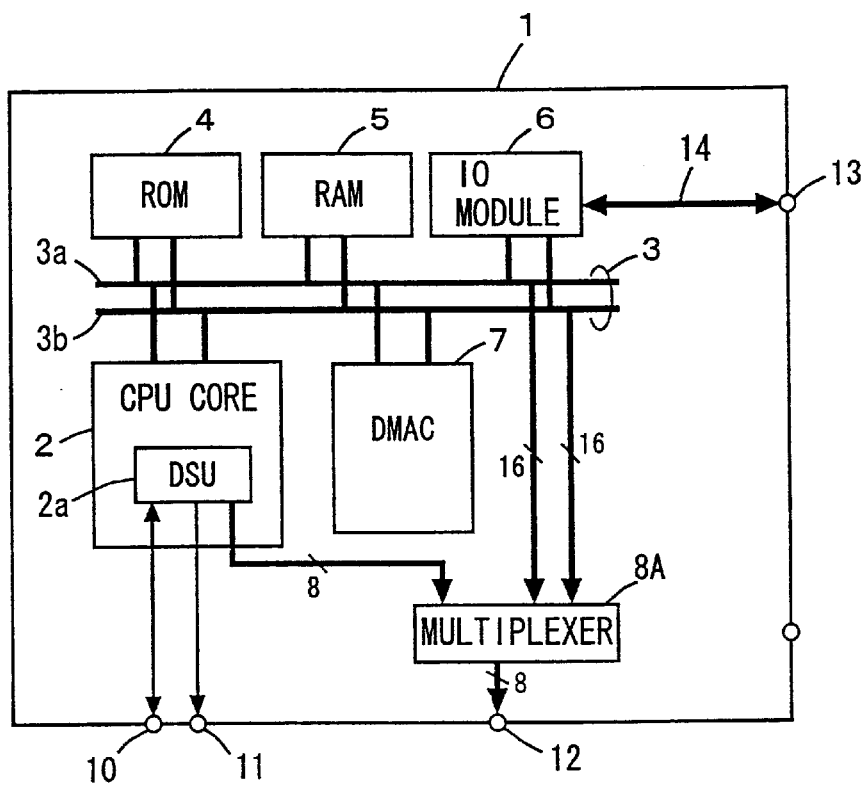
FIG. 7 schematically shows a structure of a semiconductor integrated circuit device with a processor according to a second embodiment of the invention.

FIG. 7 schematically shows a structure of a LSI with CPU according to a second embodiment of the invention. In LSI with CPU 1 shown in FIG. 7, a multiplexer 8A can select the signals on internal bus 3 and the CPU operation trace information sent from debug support unit (DSU) 2a, and the state of connection or selection of multiplexer 8 is controlled by software. More specifically, setting of the selection state of multiplexer 8 is performed under the control of CPU core 2. Therefor, it is not necessary to input externally a signal for designating the test mode, and a pin terminal for designating the test mode can be eliminated.

Figure 8:
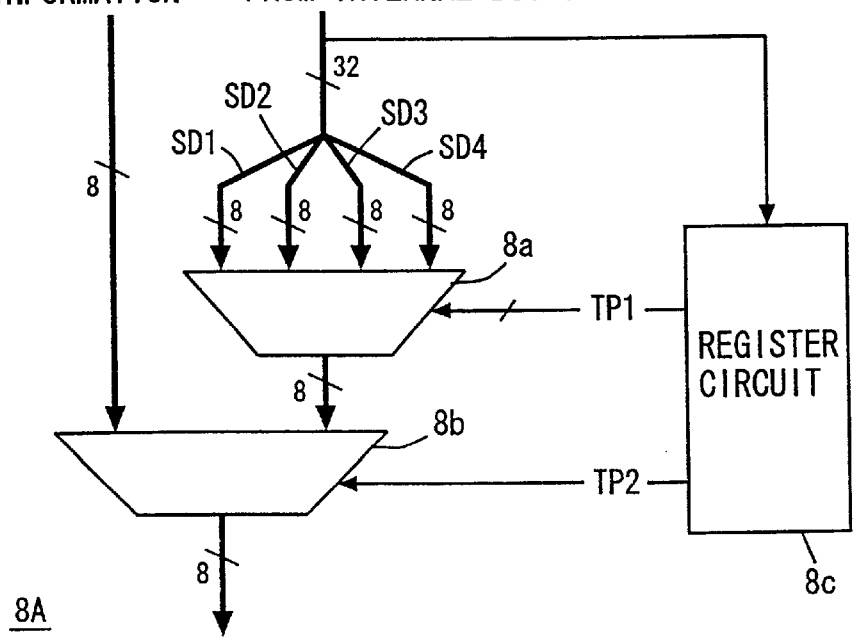
FIG. 8 schematically shows a structure of a multiplexer shown in FIG. 7.

FIG. 8 schematically shows a structure of multiplexer 8A shown in FIG. 7. In FIG. 8, multiplexer 8A includes a first multiplexer 8a which selects one sub-bus from sub-buses SD1–SD4, a second multiplexer 8b which selects one of the CPU operation trace information sent from debug support unit (DSU) 2a and the output signal of first multiplexer 8a, and a register circuit 8c which takes in test information in accordance with the signals on internal bus 3, and sends test mode instructing signals TP1 and TP2 to multiplexers 8a and 8b, respectively.

Register circuit 8c is merely required to be enabled when the signal on specific signal lines of internal bus 3 attains a predetermined pattern, take in the signal on a particular signal line of internal bus 3 as a test mode instructing signal. This structure is equivalent to a certain operation mode of a synchronous memory which is now generally used, and more specifically an operation mode of setting predetermined operation parameters in a mode register circuit storing operation parameters. Thus, the test mode instructing signal write instruction is applied to register circuit 8c in accordance with a combination of signals on specific signal lines of internal bus 3, and register circuit 8c takes in and latches a signal on a predetermined signal line. Register circuit 8c may be configured to generate, as test mode instructing signal TP1, a signal of 4 bits for selecting one of the sub-buses, or may be configured such that a signal of 2 bits is stored and decoded to generate a signal forming test mode instructing signal TP1 for selecting one sub-bus. CPU core 2 can access internal bus 3, and CPU core 2 may rewrite the test mode instructing signal to be stored in register circuit 8c under the control of debug support unit (DSU) 2a. Alternatively, debug support unit (DSU) 2a may be configured to rewrite the test mode instructing signal of register circuit 8c under the control of computer 30.

Since the test mode instructing signal can be set in register circuit 8c under the control of debug support unit (DSU) 2a, a program count value PC handled as the trace information of CPU as well as address signal AD, control signal CTL and data DT on the internal bus can be taken in as trace information without stopping the operation of LSI with CPU. Thus, an empty cycle is present in the CPU cycle due to setting of the test mode, but the trace information can be switched without stopping the operation of LSI with CPU1. Switching of this trace information may be manually performed by the user (operator) using computer 30 via the display screen, or may be performed in accordance with instructions changing the trace information inserted at appropriate intervals in a debug control program. Thereby, it is not necessary to stop the operation of LSI with CPU because, at the on-board assembly level, the test mode instructing signal is externally applied via pin terminal 9, and the trace information can be displayed on the screen of the computer by performing switching between the CPU operation trace information and the internal bus signal values even during operation of the LSI with CPU, and thereby debugging in real time can be performed.

Third Embodiment

Figures 9, 10:
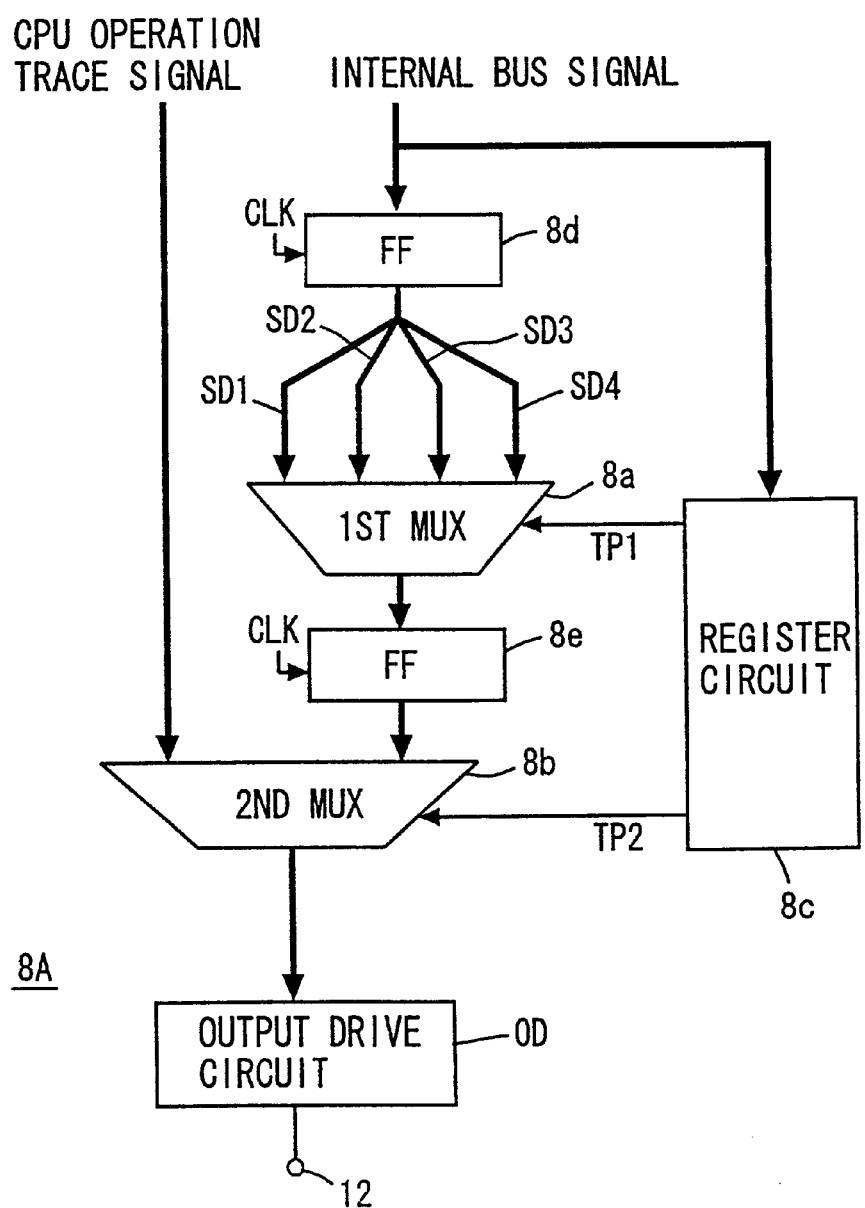
FIG. 9 shows by way of example a sequence of trace information in the structure shown in FIG. 7.
FIG. 10 schematically shows a structure of a multiplexer according to a third embodiment of the invention.

FIG. 10 schematically shows a structure of multiplexer 8A according to a third embodiment of the invention. In multiplexer 8A shown in FIG. 10, the internal bus signals on internal bus 3 are applied to a flip-flop (FF) 8d which performs a transfer operation in synchronization with clock signal CLK. Internal bus signals generated from flip-flop 8d are distributed into four sub-buses SD1–SD4. A flip-flop (FF) 8e which performs similar signal transfer in synchronization with clock signal CLK is arranged between first and second multiplexers 8a and 8b. Clock signal CLK determines the operation frequency of CPU core 2. Other structures are the same as those shown in FIG. 8. The corresponding portions bear the same reference characters, and will not be described.

When clock signal CLK is fast, the bus cycle depends on clock signal CLK so that the internal bus signals appealing on internal bus 3 change rapidly. If a delay in the signal on internal bus 3 is large, or a delay in the output driver for externally outputting the output signal of second multiplexer 8b is large, the internal bus signal cannot be generated at each cycle of clock signal CLK because delays in first and second multiplexers 8a and 8b are further added.

Owing to provision of flip-flop 8d, however, the internal bus signals are taken into flip-flop (FF) 8d in synchronization with clock signal CLK. In this operation, the delay of first multiplexer 8a exerts no influence on the signal take-in operation of flip-flop (FF) 8d. Owing to provision of flip-flop 8e for the output signal of first multiplexer 8a, the signal delay on CPU operation trace information output pin terminal 12 is provided by only delays of second multiplexer 8b and an output drive circuit OD. When each of flip-flops (FF) 8d and 8e transmits the applied signals with one clock cycle delay, the delay of 2 clock cycles in total occurs between the internal bus signals and the signals on CPU operation trace information output pin terminal 12. However, the delay by two clock cycles is recognized by the DSU-adapted debug device, and therefore causes no problem in the debugging process. It is sufficient to perform debugging with the delay of two clock cycles taken into consideration upon debugging of the internal bus signals.

Figure 11:
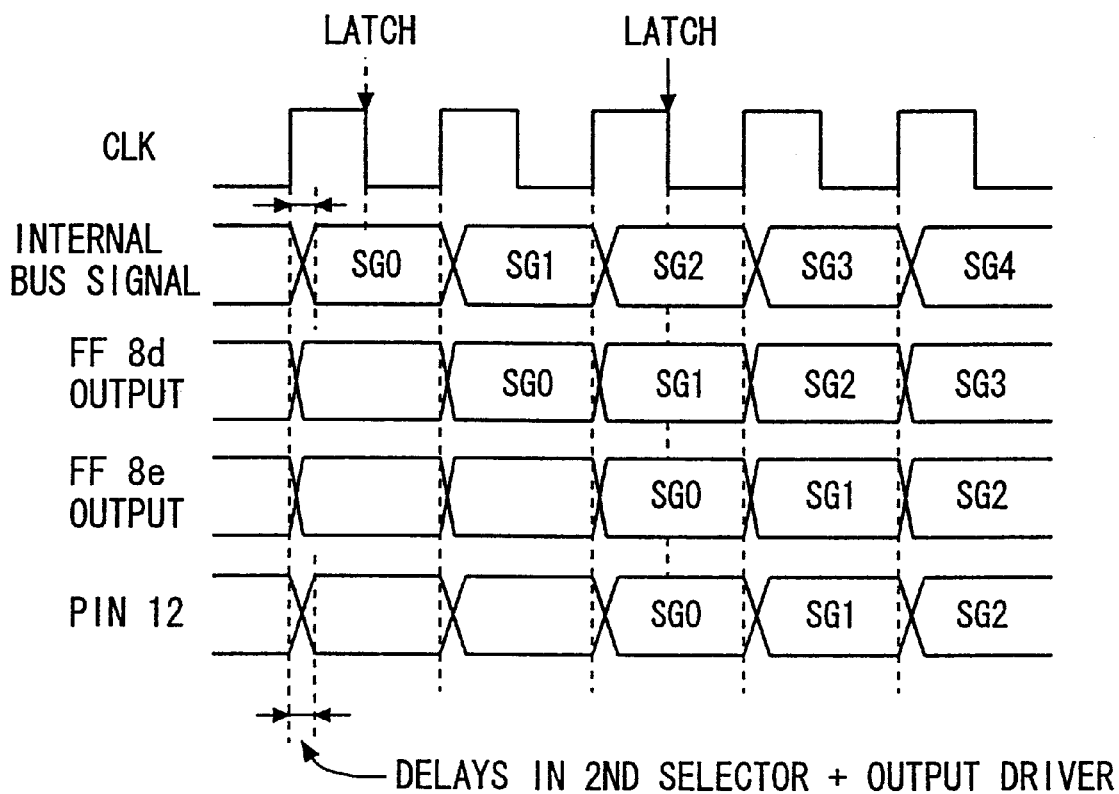
FIG. 11 shows operation timing of the multiplexer shown in FIG. 10.

FIG. 11 is a timing chart representing the operation of multiplexer 8A shown in FIG. 10. In the timing chart of FIG. 11, signals are generated onto the internal bus in synchronization with rising of clock signal CLK. Internal bus signals SG0, SG1, . . . can have large delays to be definite after elapsing of relatively large delay times with respect to rising of clock signal CLK. Even in this case, the internal bus signals in the definite state can be taken in when flip-flop (FF) 8d attains the latching state in synchronization with falling of clock signal CLK. Flip-flop (FF) 8d applies the taken signals in synchronization with rising of clock signal CLK. Accordingly, flip-flop (FF) 8d successively applies the internal bus signals with a delay of one cycle of clock signal CLK. In this operation, the output capacitance of flip-flop (FF) 8d is merely formed of an input gate capacitance of first multiplexer 8a, and therefore is small so that the signals applied to first multiplexer 8a can be rapidly driven to the definite state. Likewise, flip-flop (FF) 8e enters the latching state in synchronization with falling of clock signal CLK, and applies the taken signals in response to rising of clock signal CLK. Accordingly, even if the delay in first multiplexer 8a is large, the output signals of first multiplexer 8a are in the definite state at the time of falling of clock signal CLK. Therefore, flip-flop (FF) 8e can reliably take in the signals in the definite state, and can apply the taken signals in the next cycle. The signals sent from flip-flop (FF) 8e are transmitted via second multiplexer 8b and output drive circuit OD to CPU operation trace information pin terminals 12. Even if delays are present in second multiplexer 8b and output drive circuit OD, respectively, such delays are relatively small, and the signals can be outputted in synchronization with sufficiently fast clock signal CLK (output drive circuit OD can output the fast CPU operation trace information).

Figure 12:
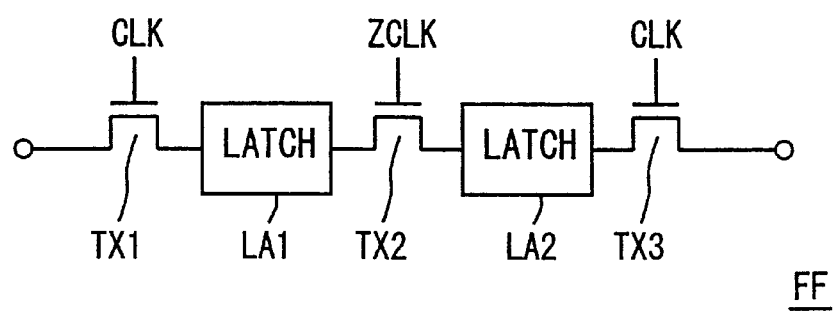
FIG. 12 shows by way of example a structure of a flip-flop circuit shown in FIG. 10.

FIG. 12 shows, by way of example, a structure of flip-flops (FF) 8d and 8e shown in FIG. 10. In FIG. 12, flip-flop (FF) includes a transfer gate TX1 which is turned on to pass a signal applied thereto when clock signal CLK is at H-level, a latch circuit LA1 which latches the signal applied from transfer gate TX1, a transfer gate TX2 which passes therethrough the signal latched by latch circuit LA1 when a complementary clock signal ZCLK is at H-level, a latch circuit LA2 which latches the signal transmitted from transfer gate TX2, and a transfer gate TX3 which is turned on to pass therethrough the output signal of latch circuit LA2 when clock signal CLK is at H-level. Latch circuits LA1 and LA 2 are merely required to latch the applied signals, respectively. Transfer gates TX1–TX3 may be formed of CMOS transmission gates, or may be formed of tristate buffers, respectively. Flip-flop FF may have a structure transmitting the complementary signals.

In flip-flop FF shown in FIG. 12, when clock signal CLK is at H-level, transfer gates TX1 and TX3 are turned on, and latch circuit LA1 latches a newly applied signal. Also, latch circuit LA2 outputs the latched signal. When clock signal CLK falls, complementary clock signal ZCLK attains H-level, and the signal is transferred from latch circuit LA1 to latch circuit LA2. Accordingly, flip-flop FF shown in FIG. 12 can delay the signal by one clock cycle, and can transfer the signal in synchronization with clock signal CLK.

As described above, the flip-flop circuits, which transfer the signals in synchronization with clock signal CLK, are arranged between the internal bus and the first multiplexer and between first and second multiplexers, respectively. Therefore, output failure of the signal values on the internal bus, which may be caused by the delays in the internal signals and the multiplexers, can be prevented, and the internal signal values can be externally monitored with sufficient accuracy even if the LSI with CPU operates in synchronization with a fast clock.

Fourth Embodiment

Figure 13:
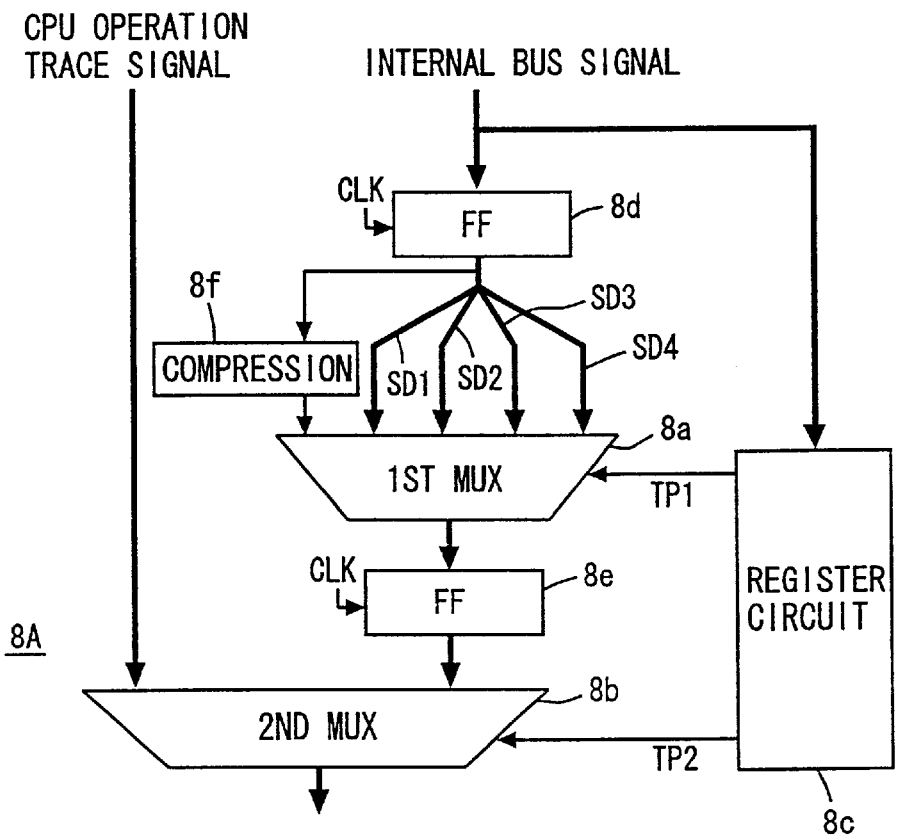
FIG. 13 schematically shows a structure of a multiplexer according to a fourth embodiment of the invention.

FIG. 13 schematically shows a structure of multiplexer 8A according to a fourth embodiment of the invention. Multiplexer 8A shown in FIG. 13 further includes a compression circuit 8f, which compresses signals sent from flip-flop (FF) 8d into signals of 8 bits, and sends the compressed signal to first multiplexer 8a. First multiplexer 8a selects one of the output signal of compression circuit 8f and the signals on sub-buses SD1–SD4 in accordance with the test mode instructing signal sent from register circuit 8c, and applies the selected signal to flip-flop (FF) 8e.

The number of the pin terminals for CPU operation tracing is restricted, e.g., to 8. Therefore, it is desired that the maximum number of internal signal state values are externally applied via the minimum number of signal lines. Compression circuit 8f compresses predetermined signals sent from flip-flop 8d into signals of 8 bits while retaining the state thereof. Thereby, the signals of up to 32 bits can be transmitted as the signals of 8 bits to CPU operation trace pin terminals 12, and the trace operation which is performed one time (the number of internal signals traced in one clock cycle) can be expanded to the extent corresponding to the bit width of the internal bus. Compression circuit 8f is merely required to have a structure for encoding the signals on the internal bus.

Figure 14:
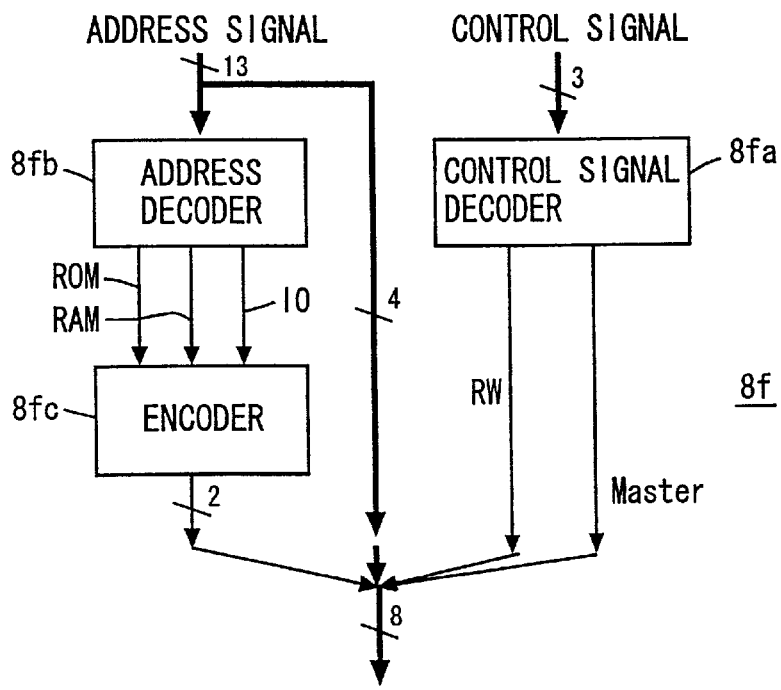
FIG. 14 shows by way of example a structure of a compression circuit shown in FIG. 13.
Figure 15:
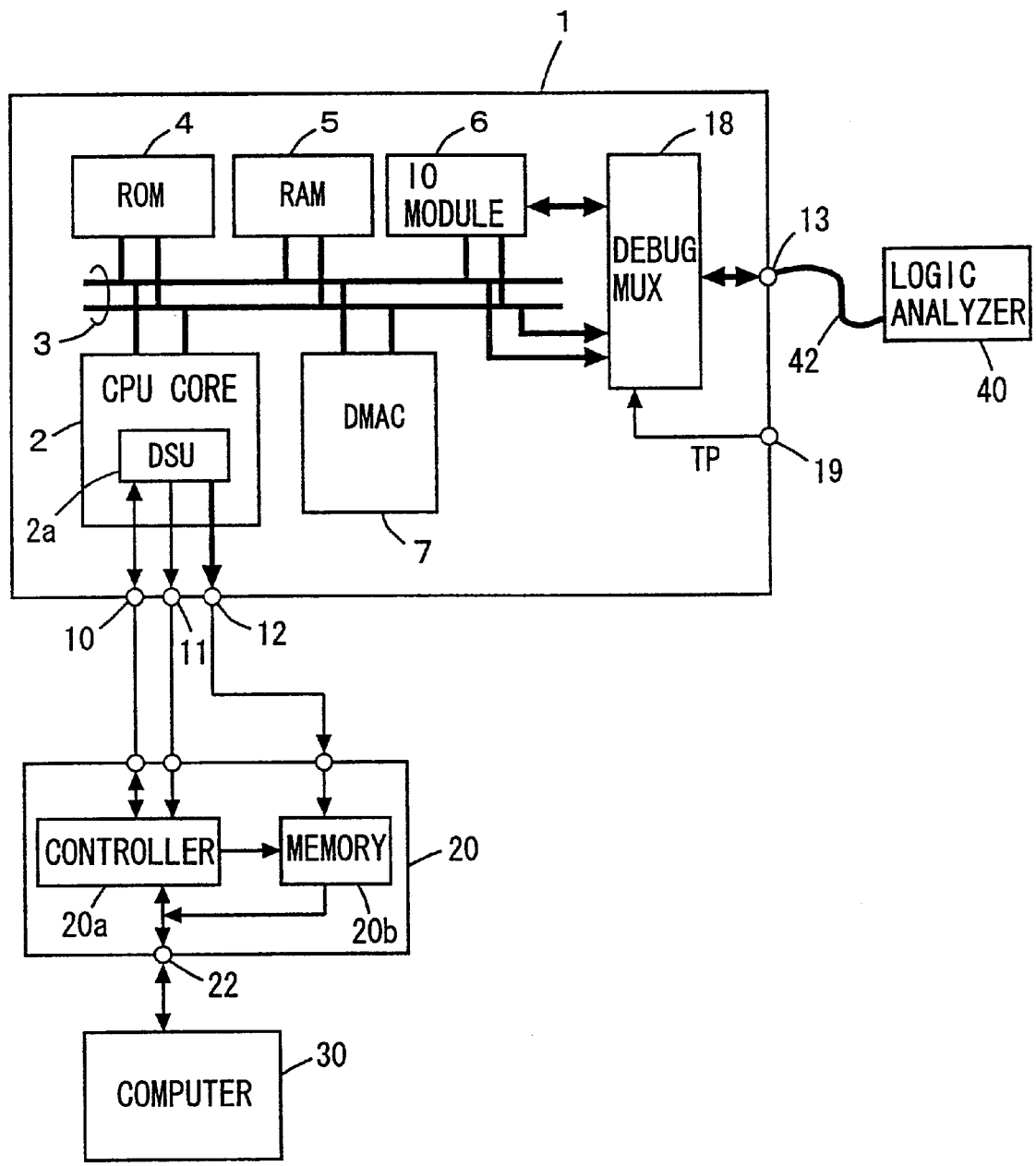
FIG. 15 shows structures of a semiconductor integrated circuit device with a processor and a debug environment thereof in the prior art.

FIG. 14 shows an example of the structure of compression circuit 8f. In FIG. 14, compression circuit 8f includes a control signal decoder 8fa which decodes the control signals of 3 bits sent from flip-flop (FF) 8d, to output signals of 2 bits, an address decoder 8fb which decodes upper 9 bits in the address signal of 13 bits sent from flip-flop (FF) 8d, and an encoder 8fc which encodes the decoded signal of 3 bits sent from address decoder 8fb to the signals of 2 bits. Control signal decoder 8fa generates read/write instructing signal RW indicating whether the read/write with respect to the memory is being performed or not, and master signal Master indicating whether the bus can be exclusively used by the CPU or direct memory access controller (DMAC).

The address decoder 8fb decodes the upper 9 bits in the address signal of 16 bits, and generates a signal indicating the access target, i.e., read-only memory (ROM) 4, random access memory (RAM) 5 or IO module (IO) 6 to be accessed. Usually, a specific address having a width of 9 bits is set for each of read-only memory (ROM) 4, random access memory (RAM) 5 and IO module (IO) 6. By decoding the specific address signal bits, address decoder 8fb determines the specific portion to be accessed for data transfer using the internal bus. The result of determination of address decoder 8fb is compressed into signals of 2 bits by encoder 8fc, and is generated therefrom. The address signal of lower 4 bits in the address signal of the remaining 7 bits is used for such a reason that, in many cases, the burst access is performed for the data access, and the continuous addresses are accessed so that the lower 4 bits change at every bus cycle.

Thereby, the signals of 8 bits in total are produced from the internal signal of 16 bits. By externally monitoring the signals of these 8 bits, the operation state of the internal bus can be estimated. Thus, it is possible to determine the specific portion to be accessed utilizing internal bus 3, and it is also possible to determine whether the portion to be accessed is subjected to data writing or data reading, and to determine the specific accessing source. Thereby, it is possible to perform the debug. More specifically, during operation of LSI with CPU, it is possible to determine whether these internal states change in accordance with the executed instructions or not, and thereby the debug can be performed.

In the structure shown in FIG. 14, compression circuit 8f utilizes the internal signals (address signal and control signal) of 16 bits. However, as long as the output signal of compression circuit 8f has the bit width of 8 bits, it is possible to utilize the signals of any bit number sent from flip-flop (FF) 8d.

In compression circuit 8f, address decoder 8fb performs decoding, and encoder 8fc performs encoding. However, two flip-flops (FF) 8d and 8e are employed, and even if delays occur in the above decoding and encoding operations, flip-flop (FF) 8e can accurately generate the compressed signals in synchronization with clock signal CLK, and the compressed information can be externally monitored even if the internal signals are fast.

Other Examples of Application

The description has been given on the LSI with CPU. However, the invention can be applied to various semiconductor integrated circuit devices provided that a processor executing the processing in accordance with applied instructions is integrated with a memory on the same semiconductor chip. For example, the invention can be applied to a logic merged memory which includes a logic processor) and a memory of a large storage capacity integratedly.

According to the invention, as described above, a CPU operation trace signal output pin terminal which is employed also conventionally is utilized in the structure for selectively providing the CPU operation trace signal and the internal signals on the internal bus. Therefore, the signals on the internal bus can be externally and accurately monitored without increase in number of the pin terminals. It is also unnecessary that a probe is in contact with the I/O pin terminal and a logic analyzer monitors the internal signals. Therefore, debugging can be performed even at the on-board level.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit device comprising:

an internal bus for transmitting signals including data;

a processor coupled to said internal bus for performing a predetermined processing, said processor including a debug support unit for supporting debugging of said semiconductor integrated circuit device while communicating a signal with a debug device arranged outside said semiconductor integrated circuit device, and said debug support unit including a circuit for extracting operation information of said processor; and a selector responsive to a test mode instructing signal for selecting and connecting one of the signals on said internal bus and said processor operation information sent from said debug support unit to a predetermined pin terminal.

2. The semiconductor integrated circuit device according to claim 1, further comprising an I/O circuit for transmitting a signal between said internal bus and an external terminal, wherein said predetermined pin terminal is independent of said external terminal.

3. The semiconductor integrated circuit device according to claim 1, wherein said internal bus is a multi-bit bus divided into a plurality of sub-buses each having a predetermined bit width; and said selector includes:

a first multiplexer for selecting one from said plurality of sub-buses of said multi-bit bus in accordance with a first test mode instructing signal, and a second multiplexer for selecting and outputting one of an output signal of said first multiplexer and the processor operation information sent from said debug support unit to said predetermined pin terminal.

4. The semiconductor integrated circuit device according to claim 1, wherein said test mode instructing signal is externally applied via a test pin terminal.

5. The semiconductor integrated circuit device according to claim 1, further comprising;

a register circuit coupled to said internal bus and receiving said test mode instructing signal via said internal bus, for storing said test mode instructing signal, and applying the stored test mode instructing signal to said selector.

6. The semiconductor integrated circuit device according to claim 1, wherein said internal bus is a multi-bit bus having a predetermined bit width; and said selector includes:

a first flip-flop circuit coupled to said internal bus for transferring the signals on said internal bus in synchronization with a clock signal, a first multiplexer for selecting a set of signals of a predetermined number of bits from output signals of said first flip-flop circuit in accordance with said test mode instructing signal, a second flip-flop circuit for transferring an output signal of said first multiplexer in synchronization with said clock signal, and a second multiplexer responsive to said test mode instructing signal for selecting and outputting one of the processor operation information sent from said debug support unit and an output signal of said second flip-flop circuit to said predetermined pin terminal.

7. The semiconductor integrated circuit device according to claim 1, wherein said internal bus is a multi-bit bus having a width of multiple bits; and said selector includes:

a compression circuit for performing a compression processing to reduce a bit number of the signals on said internal bus for outputting, a first multiplexer for selecting one of an output signal of said compression circuit and a set of signals of a predetermined number of bits of the signals on said internal bus, and a second multiplexer responsive to said test mode instructing signal for selecting and applying one of an output signal of said first multiplexer and the processor operation information sent from said debug support unit to said predetermined pin terminal.

* * * * *